United States Patent
Teoh et al.

(10) Patent No.: US 12,539,707 B2
(45) Date of Patent: Feb. 3, 2026

(54) PAGE PICKING WITH PRINT DATA

(71) Applicant: Hewlett-Packard Development Company, L.P., Spring, TX (US)

(72) Inventors: Wei Lit Teoh, Singapore (SG); Felicia Rezanda, Singapore (SG); Yi Xiong Anselm Lim, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 391 days.

(21) Appl. No.: 18/039,811

(22) PCT Filed: Dec. 3, 2020

(86) PCT No.: PCT/US2020/063097
§ 371 (c)(1),
(2) Date: Jun. 1, 2023

(87) PCT Pub. No.: WO2022/119572
PCT Pub. Date: Jun. 9, 2022

(65) Prior Publication Data
US 2024/0017557 A1    Jan. 18, 2024

(51) Int. Cl.
*B41J 13/00*    (2006.01)
*B41J 13/10*    (2006.01)
*B65H 7/00*    (2006.01)
*G06K 15/02*    (2006.01)
*G06K 15/16*    (2006.01)

(52) U.S. Cl.
CPC ......... *B41J 13/0018* (2013.01); *B41J 13/103* (2013.01); *B65H 7/00* (2013.01); *G06K 15/16* (2013.01); *G06K 15/1817* (2013.01); *B65H 2511/15* (2013.01); *B65H 2513/10* (2013.01); *B65H 2513/50* (2013.01); *G06K 2215/101* (2013.01)

(58) Field of Classification Search
CPC ....... B41J 13/0018; B41J 13/103; B65H 7/00; B65H 2511/15; B65H 2513/10; B65H 2513/50; G06K 15/16; G06K 15/1817; G06K 2215/101
See application file for complete search history.

(56) References Cited

U.S. PATENT DOCUMENTS

| | | | |
|---|---|---|---|
| 2004/0141199 A1* | 7/2004 | Park | B41J 13/0027 358/1.12 |
| 2006/0050313 A1 | 3/2006 | Hashimoto et al. | |
| 2007/0201070 A1 | 8/2007 | Tomizuka et al. | |
| 2007/0263242 A1 | 11/2007 | Takahashi | |

(Continued)

FOREIGN PATENT DOCUMENTS

| EP | 2799377 B1 | 12/2019 |
|---|---|---|
| JP | 2011-183777 A | 9/2011 |
| JP | 6476813 B2 | 3/2019 |

*Primary Examiner* — Yaovi M Ameh
(74) *Attorney, Agent, or Firm* — Foley & Lardner LLP (57) ABSTRACT

An example printing device includes a memory to store data to print to a print media, a page pick mechanism to pick a page of the print media from a print media source, and a controller connected to the memory and the page pick mechanism. The controller is to control a timing of the page pick mechanism to pick a next page of print media based on a quantification of the data in the memory for a current page.

13 Claims, 5 Drawing Sheets

(56) References Cited

U.S. PATENT DOCUMENTS

| | | |
|---|---|---|
| 2008/0106030 A1* | 5/2008 | Takenaka ................ B65H 5/34 |
| | | 271/259 |
| 2014/0319755 A1 | 10/2014 | Alaas et al. |
| 2014/0327925 A1 | 11/2014 | Hongo et al. |
| 2015/0336759 A1 | 11/2015 | Tsuyuki et al. |
| 2016/0170355 A1 | 6/2016 | Heishi et al. |
| 2016/0355361 A1* | 12/2016 | Arai ........................ B65H 3/56 |
| 2019/0279057 A1 | 9/2019 | Yeung et al. |

\* cited by examiner

PAGE PICKING WITH PRINT DATA

BACKGROUND

Printers are used to produce markings on print media, such as paper, to communicate information. Often print media is supplied as discrete pages that are individually advanced through the printer during the marking process.

DETAILED DESCRIPTION

In many types of printers, before a page can be marked, the page needs to be picked from a stack of print media. The timing of a page pick is important in maintaining a high page throughput rate. It is often the case that a next page to be printed is picked while the current page is still being printed, so that a gap of, for example, about 50 mm or less, is maintained between the trailing edge of the current page and the leading edge of the next page. If the gap is too small, there is a risk that page sensor signals become confounded (e.g., pages get too close or even overlap at a sensor, so that the sensor cannot distinguish the pages). If the gap is too large, page throughput rate is reduced. Maintaining a suitable page gap is made more difficult if the page pick decision for the next page needs to be made later during the printing of the current page (e.g., halfway or more through the movement of the current page past the printhead). If printing the remainder of the current page takes longer than expected, a page pick may be made too early, risking a jam. If printing the remainder of the current page takes less time than expected, a page pick may be made too late, reducing throughput. A late page pick decision may be required when a printer has a smaller body that constrains the media path to be shorter, exemplified by a shorter overall distance between the media tray and the printhead, or specifically, a shorter distance between a turn roller and a feed roller.

To maintain high throughput without undue risk of jamming, the next page may be picked at a high speed when there is little data left to print to the current page or when the position of the data to be printed allows a high speed pick. This predicts that the current page will soon be quickly advanced out of the media path. Hence, it is useful to perform the pick process quickly. Additional criteria may be used to reduce the risk that the high-speed pick would cause a problem. For example, if a heat-generating component of the printer is hot, then the high-speed pick may be avoided so as to allow the component to cool. If an inkjet printhead is on its way to or from a service spitting location (spittoon), then the high-speed pick may be avoided. Further, in examples where a delay clutch is used at the page pick mechanism, a two-part pick motion may be used, in that the clutch is first advanced until it engages, so that the actual pick may be carried out quickly when the time comes. Finally, media stack height may be used to time the pick, as different stack heights may require different pick times due to the different locations of each page in the stack.

Figure 1:
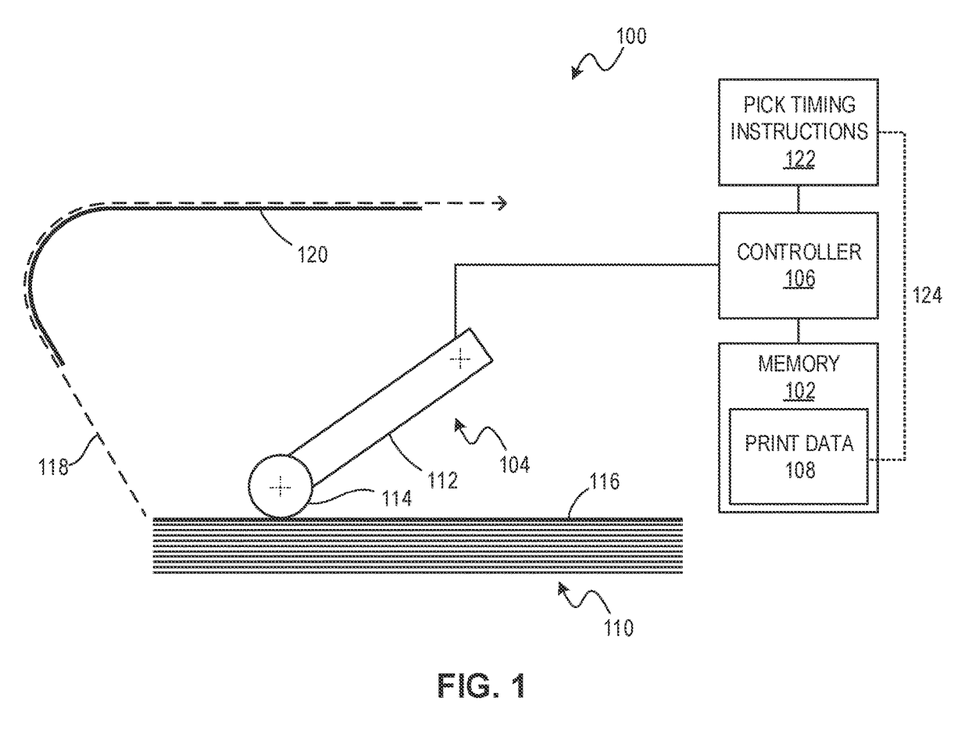
FIG. 1 is a schematic side view of an example printing device to control a timing of a next page pick based on quantification the data to print to a current page.

FIG. 1 shows an example printing device 100. The device 100 may be a subsystem of a printer, such as an inkjet printer. The device 100 includes a memory 102, a page pick mechanism 104, and a controller 106 connected to the memory 102 and the page pick mechanism 104.

The memory 102 includes a non-transitory machine-readable medium, such as a random-access memory (RAM). The memory 102 may be organized into a buffer, such as a first-in first-out (FIFO) buffer. The memory 102 may temporarily store data 108 to be printed to a print media 110, such as paper.

The page pick mechanism 104 may include an arm 112 and a roller 114. The roller 114 may contact a page 116 of a stack of print media 110 and may be driven to urge the page 116 into a media path 118, an action which may be referred to as a page pick. The arm 112 may pivot, so as to keep the roller 114 in contact with the page 116. In various examples, the page 116 is the top page of the stack of print media 110 and is the next page to be printed.

The controller 106 may include a microcontroller, a microprocessor, a field-programmable gate array (FPGA), an application-specific integrated circuit (ASIC), or a similar processor device capable of executing instructions.

The controller 106 controls a timing of the page pick mechanism 104 to pick the next page 116 of print media 112 while a current page 120 is still in the media path 118. The controller 106 may execute pick timing instructions 122 to implement this functionality. The pick timing instructions 122 may be stored in the memory 102 or in a similar non-transitory machine-readable medium.

The pick timing instructions 122 may reference 124 the print data 108 in the memory 102. For example, the pick timing instructions 122 may quantify the data 108 in a buffer implemented by the memory 102, so as to determine directly or indirectly an amount of time remaining for the current page 120 to finish printing. Quantification of the print data 108 may include referencing the position on the current page 120 where the data 108 is to cause a mark as well as the amount or density of the marks to be made. In various examples, marking the pages takes more time than merely feeding the page along the media path 118, as a printhead may be moved back and forth perpendicular to page advancement to mark the page. Hence, the pick timing instructions 122 may determine an approximate amount of marking represented by the data 108. For example, a page number in an otherwise empty document footer may require little marking, whereas an image that extends to the bottom margin of the page may require much marking. As such, for a given printing rate, the amount of time to complete the current page 120 may be determined. However, it should be noted that explicit determination of time remaining is unnecessary. Rather, the pick timing instructions 122 may associate different quantifications of the marking required by the data 108 with different pick timings.

The data 108 may indicate a position of a marking on the page 120, and such positions may be referred to as sweep positions in the example of an inkjet printhead that sweeps back and forth along the width of the page. Positions may identified be with respect to a reference position, such as the top of the page. Marking position may be considered in the quantification of the data 108 to determine pick timing. For example, as mentioned above, a page number positioned at the bottom of a sparsely printed current page 120 may trigger a fast pick because the position of the data 108 representative of the page number indicates that the current page is going to be advanced quickly. Further, sparse data 108 marked at various spaced apart locations on the page 120 may take more time to print than dense data 108 printed at near locations. Top of page may be sensed and bottom of page may be determined with reference to a standard page size or by measuring page length using a rotary encoder at the roller 114. Hence, page size may be determined during the printing of the first page, so that the timing of a subsequent page pick may reference an expected page bottom.

The controller 106 determines pick timing based on data 108 in the memory 102 for the current page 120, that is, the amount of information remaining to be printed to the current page 120. If a relatively large amount of data 108 remains to be printed to the current page 120, the controller 106 may time the pick of the next page 116 to be later than if there is a relatively lesser amount of data 108 remaining to be printed to the current page 120. The position of the data 108 remaining to be printed to the current page 120 may also be considered in the quantification of the data 120. Advancing and printing to the current page 120 takes more time than simply feeding the current page 120 along the paper path 118 after printing is completed. Hence, a faster pick may be commanded when less or no data 108 for the current page 120 is present in the memory 102, as the current page 120 may be shortly or presently fed rapidly along the print path 118. If more data 108 remains, the current page 120 may be advanced less quickly along the print path 118, so that marking of the current page 120 can occur. As such, a slower pick may be commanded to avoid running the next page 116 into the current page 120, which may disrupt printing or cause a jam.

The timing of a page pick may be considered to begin when the pick is initiated and end when the page reaches a specific point along the media path, whether the page is picked at different times and/or different speeds or rates. The timing of a next-page pick may be controlled, so that a pick of fixed rate is initiated at a specific time, whether sooner or later, with regard to the amount and position of data 108 remaining for the current page 120. Equivalently, the rate or speed of a next-page pick may be controlled to be fast or slow with regard to the amount and position of data 108 remaining for the current page 120. That is, pick rate may be determined to be a higher rate when a lesser amount of print data is in a print buffer, and pick rate may be determined to be a lower rate when a greater amount of print data is in the buffer. For example, a fixed-rate pick that is delayed may be equivalent to a slow pick. In another example, a fixed-rate pick that is initiated with less or no delay may be equivalent to a fast pick. Any one or combination of these techniques may be applied to time a pick. Any suitable number and type of pick timing (e.g., slow, fast, faster rates and/or longer or shorter delays) may be implemented.

The controller 106 may refer to a reference quantification of data to determine whether the page pick should be performed at a high speed or a low speed. When the data 108 remaining to be printed to the current page 120 is less than the reference quantification, the controller 106 may operate the page pick at a high speed. When the data 108 is not less than the reference quantification, the controller 106 may operate the page pick at relatively lower speed. Any suitable number of reference quantification may be used to implement any number of such thresholds between any suitable number of pick speeds.

The amount of data 108 and its position on the page may be quantified by, for example, computing the average of the number of sweeps weighted by sweep position from a reference position at (e.g., top of page) for measured or otherwise determined page size distance to page bottom). A reference quantification is then a threshold weighted average.

Figure 2:
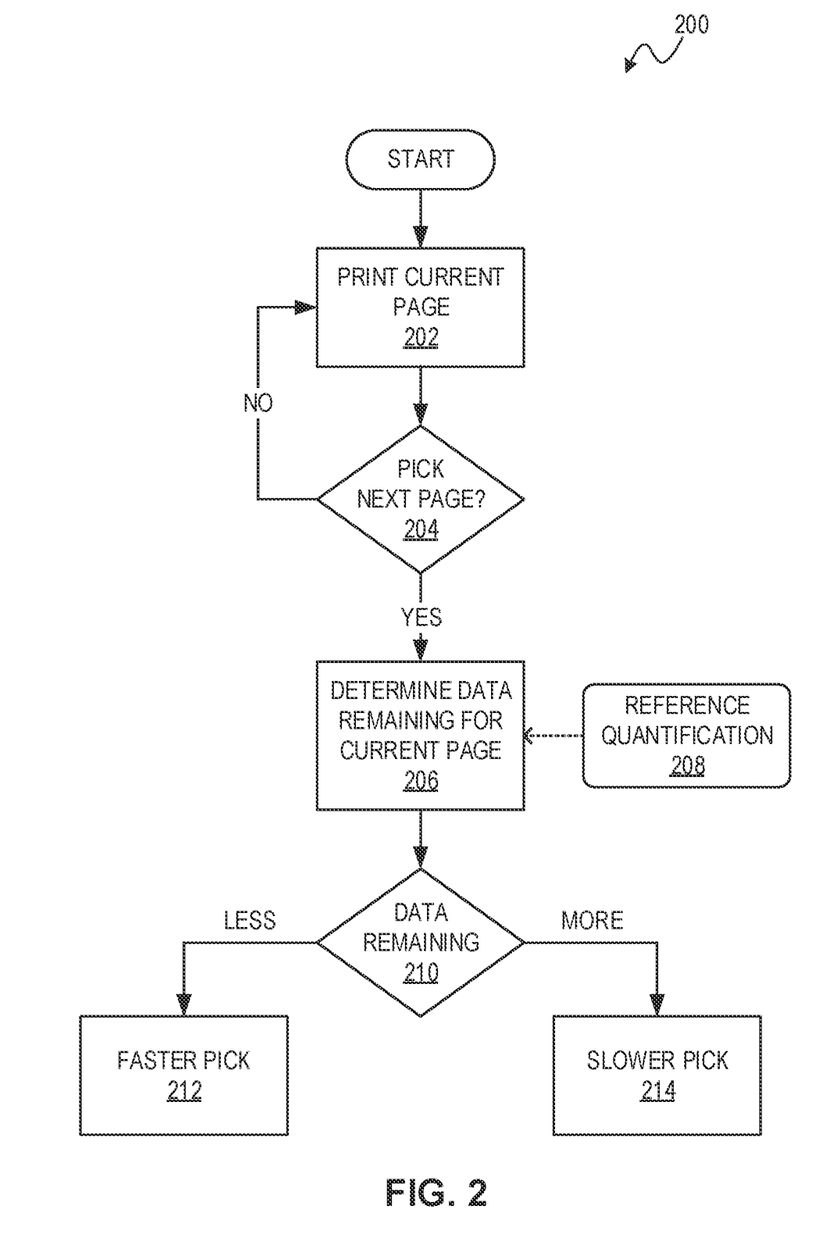
FIG. 2 is a flowchart of an example method to control a timing of a next page pick based on quantification the data to print to a current page.

FIG. 2 shows an example method 200 of controlling a timing of a next page pick based on a quantification of the data to print to a current page. The method 200 may be implemented by instructions stored in a non-transitory machine-readable medium.

At block 202, a current page undergoes marking. For example, a printhead may be moved back and forth across the page to deposit marking material, such as ink, onto the page, as the page is advanced.

At block 204, it is determined that the next page should be picked. This may be determined based on a position of the current page in the media path, i.e., the amount of advancement remaining before the current page is out of the media path. For example, a position of the current page in the media path may be monitored by an encoder or sensor, such as a rotary encoder at a roller that moves the current page along the media path. A sensor or encoder may determine that the current page has reached a point along the media path suitable for picking the next page. The current page may still have marking to undergo.

At block 206, a quantification of data remaining to be printed to the current page is determined, so that the quantification of marking remaining may be used to control a timing of a page pick mechanism to pick the next page. A buffer that stores print data may be queried and a quantification of the amount of data and its position on the page may be compared to a reference quantification 208.

When the quantification of data is less than the reference quantification, at block 210, the page pick mechanism is controlled to pick the next page at a high speed, at block 212, which may be effected by a short or no delay in the pick motion of the page pick mechanism, a faster pick motion, or a combination of such. Hence, the buffer is used to predict that the current page will be advanced quickly, so the page pick can be suitably quick as well.

When the quantification of data is not less than the reference quantification, at block 210, the page pick mechanism is controlled to pick the next page at a low speed (lower than the high speed, at block 212), at block 214, which may be effected by a longer delay in the pick motion of the page pick mechanism, a slower pick motion, or a combination of such. Hence, the buffer is used to predict that the current page will be advanced relatively slowly to accept additional marking, so the page pick can be made with suitable slower timing.

The quantification of print data in the memory or buffer may be considered to represent a deterministic delay in timing of a next page pick. That is, the time required for a printhead to make a certain amount of marking at various page locations may be known or readily quantifiable based on factors, such as the speed of the printhead and speed of page advancement. Other deterministic delays may also be considered when timing a page pick. Examples of other sources of deterministic delay include an inkjet printhead moving to or from a service spitting location and height of a stack of print media in a print media tray. The former directly adds a specific amount of time to the printing of the current page. The latter increases the distance that a picked page travels to enter the media path. Moreover, probabilistic delays may also be considered for page pick timing. Example sources of probabilistic delay include a temperature of a motor of the printing device and a temperature of a printhead of the printing device. A high temperature may indicate that thermal throttling of the motor or printhead will be commanded in the near future, so as to slow the motor or printhead to allow it to cool. Slower motion of the printhead or motor means more time to print the data for the current page. Hence, prediction of a probabilistic delay may be used to inform pick timing.

Figure 3A:
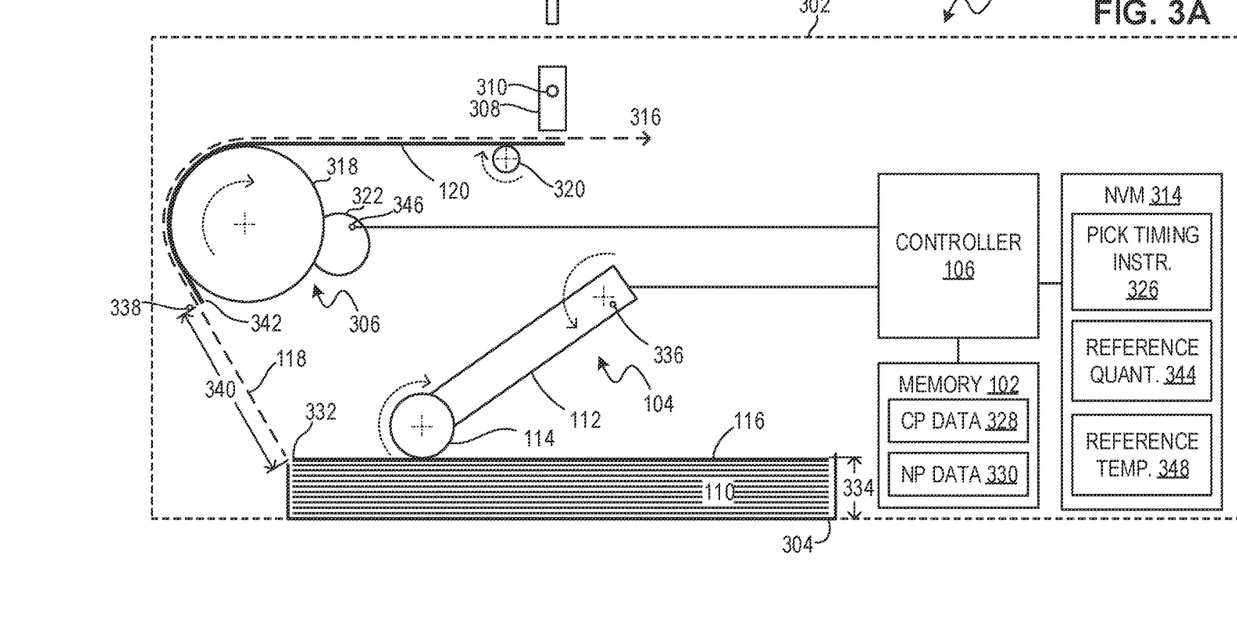
FIG. 3A is schematic side view of an example printing device to control a timing of page picks based on deterministic and/or probabilistic delay.
Figure 3B:
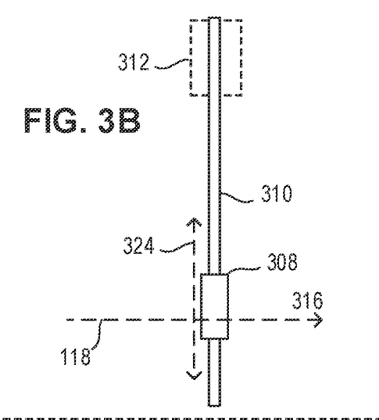
FIG. 3B is a schematic top view of some components of the device of FIG. 3A.

FIG. 3A shows a side view of an example printing device 300 and FIG. 3B shows a top view of some of the components of the printing device 300, The device 300 may be a printer, such as an inkjet printer. The device 300 includes a memory 102 to store print data 108, a page pick mechanism 104, and a controller 106 connected to the memory 102 and the page pick mechanism 104. The description of the other device(s) herein may be referenced for details of components not repeated here, where like terminology and like reference numerals denote like components. The device 300 includes other components discussed below and may further include additional components not discussed for sake of clarity.

The printing device 300 further includes a housing 302, a print-media tray 304 to hold a stack of print media 110, a roller array 306, a printhead 308 movable by a printhead drive mechanism 310, a service spitting location 312 (e.g., spittoon) for the printhead 308, and non-volatile memory (NVM) 314.

The print-media tray 304 may be loadable with print media 110, such as sheets of paper, and may be removably insertable into the housing 302 to bring the print media 110 into the influence of the page pick mechanism 104.

The roller array 306 may include any number of rollers to advance and feed pages of print media along 110 a media path 118 in a media travel direction 316. For example, the roller array 306 may include a turn roller 318, a feed roller 320, and a motor 322 to drive the turn roller 318 and/or feed roller 320. The motor 322 may also drive the pick roller 114 of the page pick mechanism 104 through a clutch.

The printhead 308 may be an inkjet printhead that is moveable back and forth along a print axis 324 by a printhead drive mechanism 310, such as a motor-driven belt, linear actuator, or similar mechanism. As the roller array 306 positions the current page 120 by discrete advances in the media travel direction 316, the printhead drive mechanism 310 moves the printhead 308 to make passes along the print axis 324 (perpendicular to the media travel direction 316) to mark a portion (e.g., a band or strip) of the current page 120 during each pass.

The printhead 308 may be positionable at the service spitting location 312 (e.g., spittoon), which is distant from the location of the page 120. At the service spitting location 312, the printhead 308 may be controlled to eject ink in a manner that clears or prevents clogging of the printhead 308. The printhead 308 may be regularly commanded to perform this function as part of normal operation.

The non-volatile memory 314 may include a non-transitory machine-readable medium, such as flash memory, electrically erasable programmable read-only memory (EEPROM), or similar memory, to store pick timing instructions 326 that are executable by the controller 106.

The memory 102, which may be volatile memory organized as a buffer, stores data for marking the pages of a print job, such as data 328 for a current page 120 and data 330 for a next page 116. Print data 328, 330 may be buffered as received from a source, such as computer or network, and removed after printing.

The pick timing instructions 326 interrogate the volatile memory 102 to determine a quantification of the data 328 remaining for printing of the current page 120 to control the page pick mechanism 104 to pick the next page 116. The pick timing instructions 326 picks the next page 116 at a rate that is based on the quantification of current-page data 328 remaining. The pick rate is determined to be a higher rate when there is a lesser amount of data 328, as quantified with reference to mark position on the page, left for marking the current page 120. The pick rate is determined to be a lower rate when a greater amount of data 328, as quantified with reference to mark position on the page, is left for marking the current page 120.

The specific rate for picking the next page 116 may be adjusted based on variation in the distance from the leading edge 332 of the next page 116 to the print path 118, as may occur due variation in height 334 of the stack of print media 110. For example, the pick rate may be increased by an amount that is inversely proportional to the stack height 334. Hence, if the stack height 334 is low, the next page 116 is picked earlier or faster. If the stack height 334 is high, the next page 116 is picked later or slower.

The device 300 may further include a stack height sensor 336, such as an encoder at the arm 112 of the page pick mechanism 104, an array of photodiodes at the tray 304, a load sensor under the tray 304, or similar. The stack height sensor 336 may be connected to the controller 106. The pick timing instructions 326 may thus further control the timing of the page pick mechanism 104 to pick the next page 116 based on a sensed height 334 of the print media 110 in the tray 304.

The printing device 300 may further include a safe gap sensor 338 positioned to establish a gap 340 between a trailing edge 342 of the current page 120 and a leading edge 332 of the next page 116. The safe gap sensor 338 may include a photodiode and may be connected to the controller 106. The pick timing instructions 326 may reference a signal from the safe gap sensor 338 to determine that the safe gap sensor 338 does not detect the current page 120, and therefore determine that the current page 120 has moved past the position of the sensor 338, as part of the criteria for picking the next page 116.

The quantification of data 328 for the current page 120 with a safe gap check may be considered a high-speed criteria that, if satisfied, allows a high pick rate for the next page 116. The high-speed criteria, as discussed above, include the buffer being empty or storing a low amount of data 328 for the current page 120. A reference quantification 344 of data may be used to evaluate the high-speed criteria.

Comparing of the data 328 remaining to print to the current page 120 with the reference quantification 344 of data may consider mark density as well as mark position. As the printhead 308 must move to the location of a mark to be made, it may be nearly just as time consuming to print many spaced apart text elements (e.g., words) as it is to print a dense image over the same area. It may be much quicker to print a page number in an otherwise empty footer area of a page, Hence, the pick timing instructions 326 may weight marks to be printed by location for comparison to the reference quantification 344.

The high-speed criteria may consider deterministic delays, such as amount of marking that remains to be performed, as discussed above, and a service spitting delay.

The high-speed criteria may further include the printhead 308 not being recently dispatched to the service spitting location 312. That is, for the high-speed criteria to be met, the printhead 308 is not on its way to or from the spittoon, as this would cause delay. Hence, the pick timing instructions 326 allow the page pick mechanism 104 to pick the next page 116 at a high speed when the printhead 308 is not being moved to or from the service spitting location 312. Conversely, the pick timing instructions 326 may cause the page pick mechanism 104 to pick the next page 116 at a speed lower than the high speed when the printhead 308 is being moved to or from a service spitting location 312. The location of the printhead 308 may be determined by a sensor or encoder at the printhead drive mechanism 310. In various examples, the pick timing instructions 326 may detect a command to dispatch the printhead 308 to the service spitting location 312, or detect another dispatch indicator, and set a timer to approximate the time of service, where the high-speed criteria cannot be met until the timer expires.

In some examples, the stack height 334 of print media 110 may also be a deterministic delay considered as part of the high-speed criteria, in that a stack height 110 above a set maximum causes the high-speed criteria to not be met.

The high-speed criteria may further consider probabilistic delays, such as possible delays resulting from the cooling of heat-generating components of the printing device 300. The motor 322 and the printhead 308 may generate heat during normal operation and may be slowed from time to time to allow for cooling. If and when the motor 322 or printhead 308 is slowed may be somewhat unpredictable and may be subject to other processes and controls. Hence, as part of the high-speed criteria, the pick timing instructions 326 may monitor a temperature of a heat-generating component, such as the motor 322 or printhead 308, to determine that a cooling delay may be imminent.

A heat-generating component, such as the roller array motor 322, a motor of the printhead drive mechanism 310, or the printhead 308 may be provided with a temperature sensor 346 connected to the controller 106 to provide a temperature signal to the controller 106. The high-speed criteria may include a maximum temperature of such heat-generating component as a condition to perform the high-speed pick, That is, the high-speed pick may only be performed when the temperature is below a reference temperature 348, which indicates that it will be unlikely for a cooling slowdown to be commanded during the pick. The page pick instructions 326 may thus prevent the page pick mechanism 104 from picking the next page 116 at a high speed when the temperature of the heat-generating component is higher than the reference temperature 348.

Figure 4:
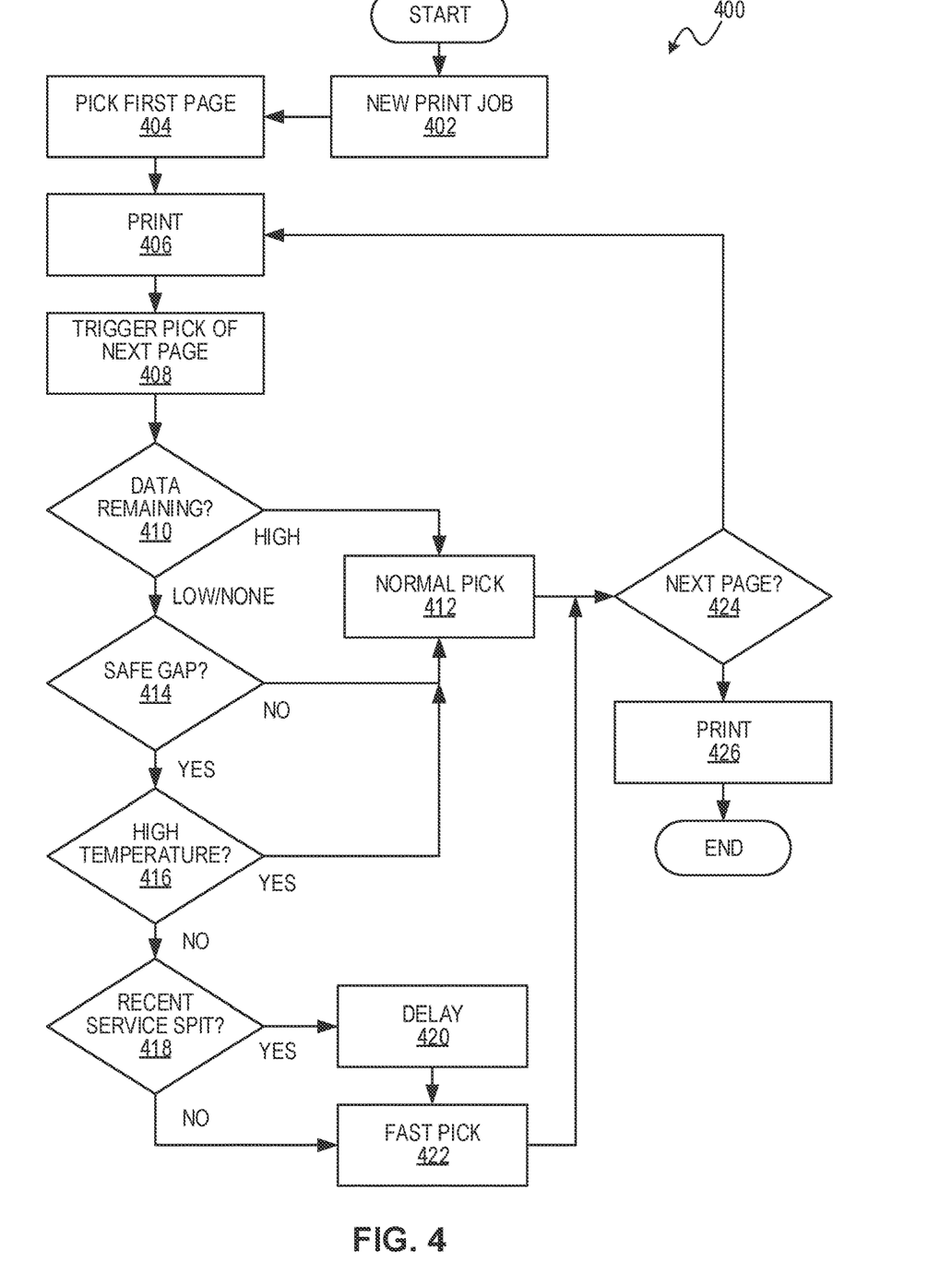
FIG. 4 is a flowchart of an example method of controlling a timing of a next page pick based on deterministic and/or probabilistic delay.

FIG. 4 shows an example method 400 of controlling a timing of page picks based on deterministic and/or probabilistic delay. The method 400 may be implemented by instructions stored in a non-transitory machine-readable medium.

At block 402, a new print job is started. The print job may include any number of pages of information to be printed to a print media, such as paper.

At block 404, the first page is picked and fed into a media path.

At block 406, information is printed to the page.

At block 408, at some point during the printing of the page, a next page pick is triggered. A sensor may detect when the page as reached a certain point along the media path or a rotary encoder at a roller may determine that the page is at such a point. This is the nominal position to trigger the pick of the next page. Subsequent blocks in the method 400 determine the rate of the pick.

At block 410, if a large amount of data, considering mark density and position, remains to be printed to the current page, then a normal pick is performed, at block 412. The amount of data remaining, considering mark density and position, in a print buffer for the current page may be compared to a reference quantification to make this determination. The normal pick may be relatively slow and may include two parts: a pre-pick and a pick. During the pre-pick, a pick mechanism may be advanced slightly to engage a clutch the next page is picked. The page pick mechanism may be paused for a time after pre-pick and before picking the next page. In addition, if the quantification of data remaining to be printed to the current page is unknown for some reason, then the normal pick is performed, at block 412.

The timing of the normal pick may be adjusted based on a height of print media in a print media tray. If stack height is low so that the top page to be picked is further the media path, then the normal pick may have its speed increased or delay reduced.

If the data remaining to be printed is less than the reference quantification then, at block 414, it is determined whether a safe gap exists between the tail edge of the current page and the leading edge of the page to be picked. A suitably positioned safe gap sensor may be referenced. If a safe gap does not exist, then the normal pick is performed, at block 412.

If a safe gap exists then, at block 416, it is determined whether a heat-generating component of the printer, such as a motor or printhead, is at a temperature that could require slowing of operations to allow for cooling, where such slowing of operations could cause a fast picked page to jam with the current page. A measured temperature may be compared to a reference temperature that establishes a maximum temperature to perform a fast pick. If the temperature is too high to perform a fast pick, then the normal pick is performed, at block 412.

If the temperature is not too high then, at block 418, it is determined whether the printhead has been recently dispatched to a service spitting location. If the printhead is determined to be servicing or on its way to or from servicing, then a delay is elapsed, at block 420, before a fast pick is performed, at block 422. The delay at block 420 may be selected to correspond with a service spitting time, whether an average time, estimated time, or measured time.

If the printhead has not been recently dispatched to a service spitting location, then the fast pick is performed, at block 422, without delay, which is faster than the fast pick with delay.

The timing of the fast pick may be adjusted based on a height of print media in a print media tray. If stack height is low so that the top page to be picked is further the media path, then the fast pick may have its speed increased or delay reduced.

The fast pick, both with and without delay, may be faster than the normal pick.

The delay of block 420 speaks to the deterministic nature of the delay resulting from a service spitting operation. That is, the service spitting delay may be approximated reliably, Contrast this with the probabilistic nature of the delay due to high temperature, at block 416, which less predicable and thus more suitable for the normal pick.

Blocks 410, 414, 416 may be considered high-speed pick criteria that, if met, allow for a fast pick that takes into account, at block 418, a possible deterministic delay. If the high-speed pick criteria of blocks 410, 414, 416 are not met, then the method 400 reverts to a normal or slow speed pick. Hence, the method 400 tests for the opportunity to perform a high-speed pick and adjusts the high speed pick if necessary, and, if the high-speed pick risks a jam or other undesirable event, then performs the pick normally, that, is at a lower rate.

After the pick at block 412 or 422, it is determined whether another page pick will be needed for a subsequent page, at block 424. If another pick will be needed, the method 400 continues with printing, at block 406. Otherwise, this is the last page pick and the method 400 ends after completing printing of the last page at block 426.

Figure 5:
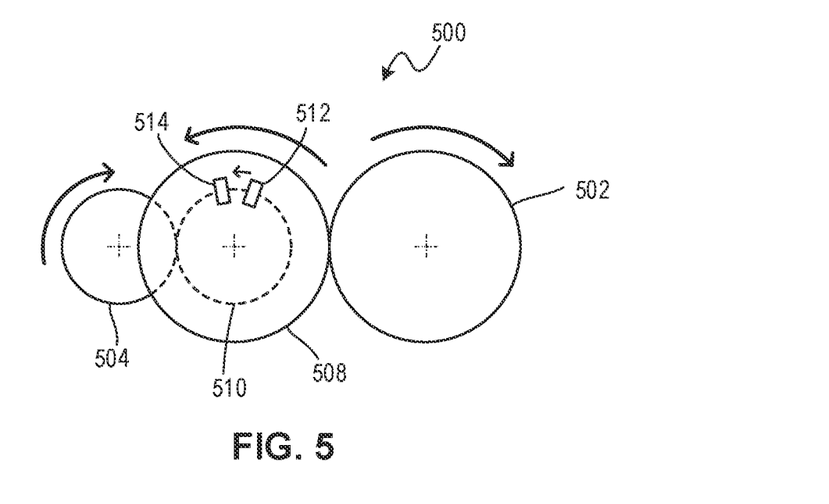
FIG. 5 is a schematic side view of an example clutch for a page pick mechanism.

FIG. 5 shows an example clutch mechanism 500 for a page pick mechanism, such as the page pick mechanism 104 discussed elsewhere herein.

The clutch mechanism 500 includes a drive clear 502, a driven gear 504, and a clutch 506 connecting the driven gear 504 to the drive gear 502. The drive gear 502 is rotated by a motor and provides input power. The driven gear 504 is connected to a pick roller and provides pick motion to a page of print media.

The clutch 506 includes a first gear 508 meshed with the drive gear 502 and a second gear 510 coaxial with the first gear 508 and meshed with the driven gear 504, The first and second gears 508, 510 are independently rotatable about the same axis. The first and second gears 508, 510 include respective interlock protrusions 512, 514 that are positioned to contact each other during relative rotation of the first and second gears 508, 510.

In operation, the drive gear 502 turns the first gear 508, which rotates without causing rotation in the second gear 510 until the interlock protrusion 512 of the first gear 508 contacts the interlock protrusion 514 of the second gear 510. Thereafter, the clutch 500 is engaged and the interlock protrusion 512 of the first gear 508 pushes the interlock protrusion 514 of the second gear 510, due to continued rotation of the drive gear 502, so as to rotate the second gear 510 and cause rotation of the meshed driven gear 504.

The first part of a normal or slow pick may be motion sufficient to cause the clutch to engage by bringing the interlock protrusion 512 of the first gear 508 into contact with the interlock protrusion 514 of the second gear 510.

Figure 6:
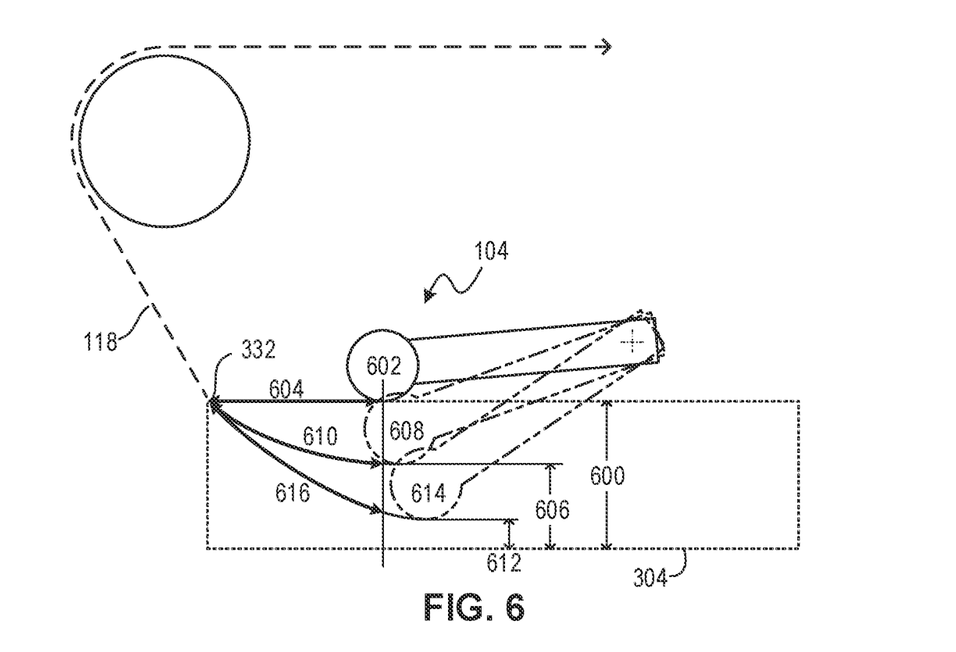
FIG. 6 is a schematic side view of a media tray showing various media stack heights and resulting increased lengths of media path.

FIG. 6 shows a media tray 304 with media stack heights and resulting increased lengths of a media path.

When the media stack has a high or maximum height 600 for the tray 304, a page pick mechanism 104 is at an orientation that places the pick roller at position 602 on top of the stack. A leading edge 332 of the next or top page of the stack is at the start of the media path 118, which is a base distance 604 from the pick roller. After a number of pages have been fed, the stack height 606 is reduced and the page pick mechanism 104 is oriented to place the pick roller at lower position 608 on top of the reduced stack. At this position, the distance comparable to the base distance 604 is an extended distance 610. The top page at the reduce stack height 606 must travel a further distance than the top page at the full height 600, specifically the difference between the extended distance 610 and the base distance 604. The same is true for a still further reduced stack height 612, which places the pick roller at a still lower position 614, which results in a still larger extended distance 616. The top page at this stack height 612 travels further than the top page at the initial stack height 600 by the difference between the extending distance 616 and the base distance 604.

A relationship exists between stack height 600, 606, 612 and extra time needed for the leading edge of the top page to reach the same position on the media path 118. It is an inverse relationship of stack height to extra time, in that the lower the stack height the more time is needed. This relationship may be referenced to start a page pick earlier as stack height is reduced.

In view of the above, it should be apparent that the timing of a next page pick can be increased based on quantification of data remaining to print to a current page, as well as other deterministic and/or probabilistic factors, so as to increase throughput without unduly increasing risk of a jam or other malfunction.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A printing device comprising:
 a memory to store data to print to a print media;
 a page pick mechanism to pick a page of the print media from a print media source, wherein the page pick mechanism includes a clutch; and
 a controller connected to the page pick mechanism to control a timing of the page pick mechanism to pick a next page of print media based on a quantification of the data for a current page and control the page pick mechanism to engage the clutch before picking the next page when the quantification of data is unknown.

2. The printing device of claim 1, wherein the controller is to control the page pick mechanism to pick the next page at a high speed when the quantification of data is less than a reference quantification, wherein the high speed is higher than a low speed at which the controller is to control the page pick mechanism to pick the next page when the quantification of data is not less than the reference quantification.

3. The printing device of claim 2, further comprising a motor to drive a component of the printing device, wherein the controller is to control the page pick mechanism to pick the next page at the high speed when the quantification of data is less than the reference quantification and when the motor has a temperature lower than a reference temperature.

4. The printing device of claim 2, further comprising an inkjet printhead, wherein the controller is to control the page pick mechanism to pick the next page at the high speed when the quantification of data is less than the reference quantification and when the inkjet printhead is not being moved to or from a service spitting location.

5. The printing device of claim 1, wherein the controller is to determine the quantification of the data for the current page based on an amount of marking to be performed and a position of the marking on the current page.

6. The printing device of claim 1, wherein the print media source includes a tray and wherein the controller is further to control the timing of the page pick mechanism to pick the next page of print media based on a sensed height of the print media in the tray.

7. A printing device comprising:
 a buffer to store data to print to a print media;
 a page pick mechanism to pick pages of the print media from a print media source;
 a safe gap sensor positioned at a media path to detect a page of the print media in the media path;
 a heat-generating component; and a controller connected to the buffer, the page pick mechanism, and the safe gap sensor, wherein the controller is to:

control a pick of a next page of the print media at a high speed if high-speed criteria are met, wherein the high-speed criteria include:

the buffer being empty or storing a low quantification of data remaining to be printed to a current page and the safe gap sensor not detecting the current page; and the heat-generating component having a temperature that is lower than a reference temperature.

8. The printing device of claim 7, wherein, the controller is to control the pick of the next page at a low speed that is lower than the high speed if the high-speed criteria are not met.

9. The printing device of claim 7, wherein the printing device further includes an inkjet printhead, wherein the high-speed criteria further include the inkjet printhead not being recently dispatched to a service spitting location.

10. The printing device of claim 7, wherein the controller is to control a timing of the pick of the next page based on a height of print media in a print media tray.

11. A non-transitory machine-readable medium comprising instructions that when executed by a processor cause the processor to:

control a page pick mechanism of a printing device to provide a next page of print media to a media path at a rate that is based on a quantification of data in a buffer that remains to be printed to a current page of the print media, wherein the quantification is based on marking amount and position on the current page, wherein the rate is determined to be a higher rate when a lesser quantification of data is in the buffer, and wherein the rate is determined to be a lower rate when a greater quantification of data is in the buffer and an inkjet printhead is recently dispatched to a service spitting location.

12. The non-transitory machine-readable medium of claim 11, wherein the rate is determined to be the lower rate when a probabilistic delay in advancement of the current page is detected.

13. The non-transitory machine-readable medium of claim 11, wherein the rate is determined to be a rate between the higher rate and the lower rate when a deterministic delay in advancement of the current page is detected.

* * * * *